(12) United States Patent
Kato et al.

(10) Patent No.: US 10,067,250 B2
(45) Date of Patent: Sep. 4, 2018

(54) RADIATION DETECTING APPARATUS AND RADIATION IMAGING SYSTEM

(71) Applicant: CANON KABUSHIKI KAISHA, Tokyo (JP)

(72) Inventors: Katsushi Kato, Kawasaki (JP); Takaaki Gonda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 14/796,169

(22) Filed: Jul. 10, 2015

(65) Prior Publication Data

US 2016/0025866 A1  Jan. 28, 2016

(30) Foreign Application Priority Data

Jul. 23, 2014  (JP) ................................ 2014-150201

(51) Int. Cl.
 *H01J 31/50* (2006.01)
 *H05G 1/08* (2006.01)
 *G01T 7/00* (2006.01)
(52) U.S. Cl.
 CPC ..................................... *G01T 7/00* (2013.01)
(58) Field of Classification Search
 CPC ....... G01T 7/00; A61B 6/4291; A61B 6/4488; A61B 6/4405; A61B 2560/0456;
(Continued)

(56) References Cited

U.S. PATENT DOCUMENTS 4,288,700 A  9/1981  Grass et al.
4,831,639 A  5/1989  Harke
(Continued)

FOREIGN PATENT DOCUMENTS

CN  101374463 A  2/2009
CN  202761292 U  3/2013
(Continued)

OTHER PUBLICATIONS

Search and examination report dated Jan. 19, 2016, in corresponding UK Patent Application No. 1512834.1 (6 pages).
(Continued)

*Primary Examiner* — Irakli Kiknadze
(74) *Attorney, Agent, or Firm* — Fitzpatrick, Cella, Harper & Scinto (57) ABSTRACT

Provided is a radiation detecting apparatus, including: a radiation detector arranged to detect radiation; an electrical circuit board configured to control the radiation detector; a cooling unit arranged to cool the radiation detector and the electrical circuit board; and a casing arranged to accommodate the radiation detector, the electrical circuit board, and the cooling unit therein, in which at least an outer surface of the casing has a recessed portion that is recessed across a back surface portion, which is on an opposite side to a side in which the radiation enters, and a lateral surface portion adjacent to the back surface portion, and in which the recessed portion has lead-out portions formed therein, through which a wiring line removably connectable to the electrical circuit board and a piping line arranged to allow a cooling medium to flow to the cooling unit are respectively led out external to the casing.

13 Claims, 6 Drawing Sheets

(58) Field of Classification Search
CPC ... A61B 6/4233; A61B 6/4423; A61B 6/4494;
A61B 6/563; A61B 6/547; A61B 6/56;
A61B 6/107; A61B 6/4283; A61B 6/548;
A61B 6/00; A61B 6/035; A61B 6/0407;
A61B 6/14; A61B 6/032; A61B 6/4085;
A61B 6/06; A61B 6/4441; A61B 34/10;
A61B 2034/101; A61B 6/466; A61B
6/583; A61B 6/027; A61B 6/482; A61B
6/0457; A61B 6/4021; A61B 6/4452
USPC .......... 378/98.8, 189–191, 199, 200
See application file for complete search history.

(56) References Cited

U.S. PATENT DOCUMENTS

| | | | | |
|---|---|---|---|---|
| 5,912,943 | A * | 6/1999 | Deucher | H05G 1/02 378/167 |
| 5,913,943 | A * | 6/1999 | Viola | B62K 23/06 74/488 |
| 6,967,333 | B2 * | 11/2005 | Hata | G01T 1/1648 250/370.09 |
| 7,104,687 | B2 | 9/2006 | Okamura et al. | |
| 7,482,595 | B1 | 1/2009 | Ertel | |
| 7,629,587 | B2 * | 12/2009 | Yagi | A61B 6/4233 250/370.15 |
| 7,777,192 | B2 * | 8/2010 | Ohta | A61B 6/00 250/370.09 |
| 7,839,968 | B2 * | 11/2010 | Miyako | A61B 6/0414 378/189 |
| 7,847,263 | B2 | 12/2010 | Yagi et al. | |
| 7,997,798 | B2 * | 8/2011 | Liu | G01T 1/2018 378/189 |
| 8,834,022 | B2 * | 9/2014 | Koyanagi | A61B 6/56 250/370.09 |
| 9,669,237 | B2 | 6/2017 | Calvert | |
| 2004/0234040 | A1 | 11/2004 | Okamura et al. | |
| 2009/0014661 | A1 | 1/2009 | Yagi et al. | |
| 2009/0052629 | A1 * | 2/2009 | Ohta | H01J 31/49 378/189 |
| 2009/0080620 | A1 * | 3/2009 | Miyako | A61B 6/502 378/199 |
| 2009/0180595 | A1 * | 7/2009 | Spahn | A61B 6/4233 378/197 |
| 2010/0044573 | A1 | 2/2010 | Yagi et al. | |
| 2010/0202589 | A1 * | 8/2010 | Ohta | A61B 6/4233 378/98 |
| 2012/0085078 | A1 * | 4/2012 | Rijken | A61B 6/56 59/78.1 |
| 2012/0134477 | A1 | 5/2012 | Koyanagi | |
| 2013/0083898 | A1 | 4/2013 | Tajima et al. | |
| 2014/0107468 | A1 | 4/2014 | Calvert | |
| 2016/0263400 | A1 | 9/2016 | Calvert | |
| 2017/0120074 | A1 | 5/2017 | Calvert | |

FOREIGN PATENT DOCUMENTS

| | | |
|---|---|---|
| CN | 103608692 A | 2/2014 |
| CN | 102551763 B | 4/2015 |
| FR | 2641179 A1 | 7/1990 |
| JP | 6-318688 A | 11/1994 |
| JP | 11-271454 A | 10/1999 |
| JP | 2005-181922 A | 7/2005 |
| JP | 4258018 B2 | 4/2009 |
| JP | 2010-284375 A | 12/2010 |
| JP | 2010-25984 A | 2/2012 |
| JP | 2014-35250 A | 2/2014 |
| RU | 2394492 C2 | 7/2010 |
| WO | 2006/073031 A1 | 7/2006 |

OTHER PUBLICATIONS

Office Action dated Feb. 15, 2017, in counterpart Russian Patent Application No. 2015130341 (14 pages).
Office Action dated Nov. 16, 2017, in counterpart CN Patent Application No. 201510426687.X (9 pages).
English abstract for CN 102551763 A published Jul. 11, 2012 (corresponds to CN 102551763 B).
Office Action dated Mar. 13, 2018, in counterpart application KR 10-2015-0103684 (15 pages).
Office Action dated May 8, 2018, in counterpart JP application 2014-150201 (8 pages).

* cited by examiner

RADIATION DETECTING APPARATUS AND RADIATION IMAGING SYSTEM

BACKGROUND OF THE INVENTION

Field of the Invention

The present invention relates to a radiation detecting apparatus and a radiation imaging system, and more particularly, to a radiation detecting apparatus configured to detect radiation transmitted through a subject to generate a radiation fluoroscopic image, and to a radiation imaging system to which a radiation imaging apparatus including the radiation detecting apparatus is applied.

Description of the Related Art

Medical treatment of performing endovascular treatment (intervention) under fluoroscopy with use of a radiation imaging apparatus has become general. Further, in the intervention or the like, there is widely used a radiation imaging apparatus of a C-shaped arm type as disclosed in Japanese Patent Application Laid-Open No. 2010-284375. In such a radiation imaging apparatus, as an X-ray detector configured to detect X-rays transmitted through an object to be inspected, a flat panel detector (planar X-ray detector) is becoming increasingly widespread, which has an advantage of less image distortion and has been remarkably improved in performance in recent years. Further, in a case of treatment of the abdomen or the chest, there is a demand for an X-ray detector with a large-sized imageable range so that the entire trunk of the body can be fluoroscopically observed in the same field of view. In Japanese Patent Application Laid-Open No. H11-271454, there is disclosed a radiation detecting apparatus having a radiation detector accommodated therein. As disclosed in Japanese Patent Application Laid-Open No. H11-271454, there is provided an electrical cable for connecting the radiation detecting apparatus to another apparatus or device so as to allow control of the radiation detecting apparatus, including the radiation detector, and acquire image information from the radiation detector. Further, in Japanese Patent No. 4258018, there is disclosed a configuration in which the radiation detecting apparatus includes a reflux path for a cooling medium so as to cool the radiation detector or electrical elements and the like mounted on an electrical circuit board. In such a configuration, a conduit line for connecting the radiation detecting apparatus to an external cooling medium supply side is provided.

Incidentally, in the intervention using the radiation imaging apparatus, in order to reliably carry out fluoroscopy of a part to be imaged of a person to be inspected, so as to obtain a high-quality image less adversely affected by scattered rays, it is preferred to place an image receiving unit of the imaging apparatus as close to the part to be imaged as possible. In view of this, it is preferred to place an outer part of the image receiving unit close to the body of the person to be inspected. Therefore, there is a demand for downsizing of the image receiving unit having the radiation detecting apparatus accommodated therein. Further, in order to improve the workability during installation or maintenance, the electrical cable or the cooling medium conduit line for connecting the radiation detecting apparatus to the other apparatus or devices may be configured to be mountable and removable. In such a case, a lead-out position for the electrical cable or the cooling medium conduit line is also required to be considered in terms of maintenance workability.

SUMMARY OF THE INVENTION

The present invention has been made in view of such circumferences, and provides a radiation imaging apparatus capable of obtaining a high-quality image while saving a routing space for a wiring/piping line to be connected to a radiation detecting apparatus, and while improving workability during installation or maintenance.

According to one embodiment of the present invention, there is provided a radiation detecting apparatus, including: a radiation detector arranged to detect radiation entering the radiation detecting apparatus; an electrical circuit board configured to control the radiation detector; a cooling unit arranged to cool the radiation detector and the electrical circuit board; and a casing arranged to accommodate the radiation detector, the electrical circuit board, and the cooling unit therein, in which at least an outer surface of the casing has a recessed portion that is recessed across a back surface portion, which is on an opposite side to a side in which the radiation enters the radiation detecting apparatus, and a lateral surface portion adjacent to the back surface portion, and in which the recessed portion has lead-out portions formed therein, through which a wiring line removably connectable to the electrical circuit board and a piping line arranged to allow a cooling medium to flow to the cooling unit are respectively led out external to the casing.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Now, embodiments of the present invention are described in detail with reference to FIG. 1 to FIG. 9. Note that, in the following embodiments, a medical radiation imaging apparatus of a C-shaped arm type, which is configured to image a person to be inspected with use of radiation, is represented as an example of a radiation imaging apparatus. However, the present invention is not limited to the medical radiation imaging apparatus of the C-shaped arm type. The present invention is also applicable to a radiation imaging apparatus configured to image subjects other than a person to be inspected, or other various radiation imaging apparatus.

(First Embodiment)

Figure 1:
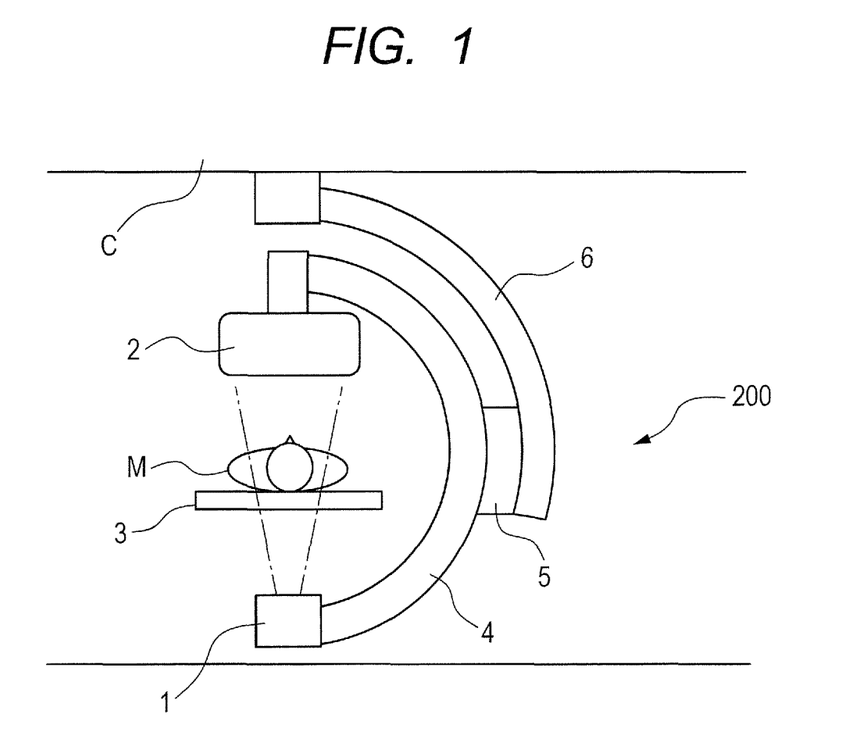
FIG. 1 is a schematic view of a configuration of a radiation imaging apparatus according to a first embodiment of the present invention.

First, an overall configuration of a radiation imaging apparatus 200 according to a first embodiment of the present invention is described with reference to FIG. 1. FIG. 1 is a schematic view of the configuration of the radiation imaging apparatus 200. The radiation imaging apparatus 200 includes a radiation generating unit 1, an image receiving unit 2, a C-shaped arm 4, a supporting arm 6, and a guiding unit 5. The radiation generating unit 1 and the image receiving unit 2 are arranged on one end portion and the other end portion of the C-shaped arm 4, respectively, to thereby be integrally supported by the C-shaped arm 4. A subject M (object to be inspected) is arranged between the radiation generating unit 1 and the image receiving unit 2, to thereby obtain a fluoroscopic image (radiation image) of the subject M. Note that, the C-shaped arm 4 is supported by the supporting arm 6 through intermediation of the guiding unit 5. With a moving mechanism provided to the guiding unit 5 and the supporting arm 6, the imaging direction can be arbitrarily changed. The supporting arm 6 is fixed to a ceiling C, a floor, or a wall of a hospital room or a radiation imaging room. In FIG. 1, a configuration in which the supporting arm 6 is fixed to the ceiling C of the hospital room or the radiation imaging room is represented, but the present invention is not limited to this configuration. Further, for imaging of the subject M, a bed 3 is used so as to support the subject M in a decubitus position between the radiation generating unit 1 and the image receiving unit 2. The bed 3 is supported by support legs, but only the bed 3 is illustrated in FIG. 1. In the radiation imaging apparatus 200 having such a configuration, the positional relationship between the radiation generating unit 1 and the image receiving unit 2 is maintained by the C-shaped arm 4, and hence the labor and time required for an operation to adjust the mutual positions can be reduced. Therefore, the radiation imaging apparatus 200 can be used for imaging that requires frequent change and fine adjustment of the imaging direction, and can be utilized for intervention or the like.

Figure 2:
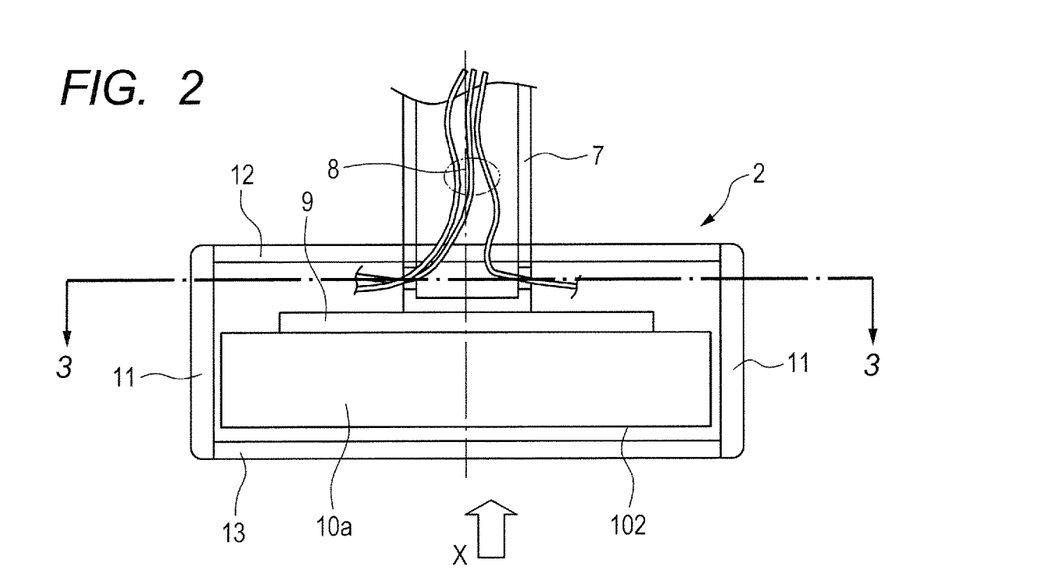
FIG. 2 is a schematic sectional view of an image receiving unit.
Figure 3:
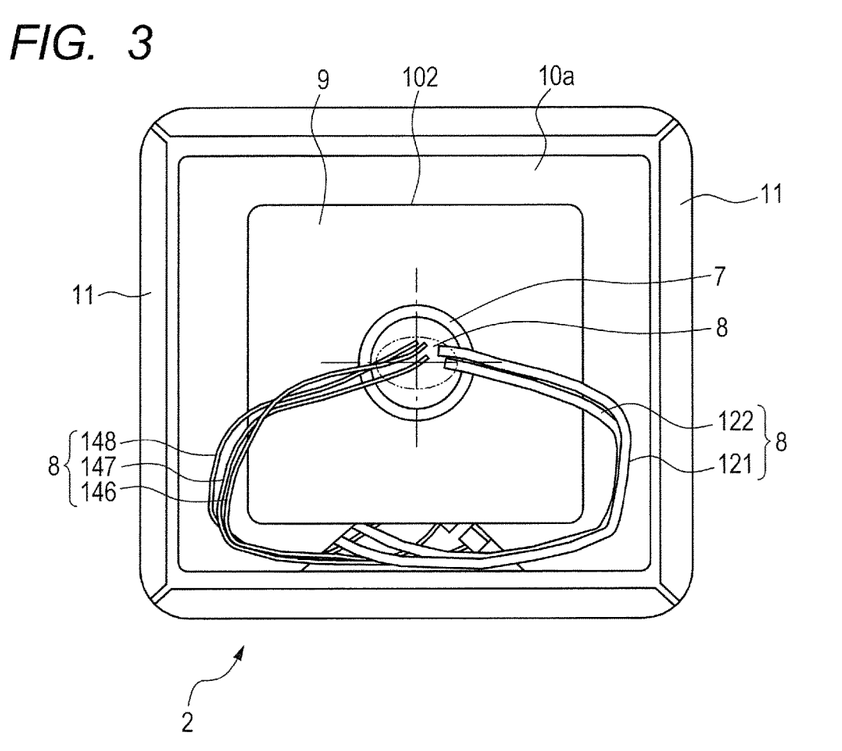
FIG. 3 is a schematic sectional view of the image receiving unit of the radiation imaging apparatus.

Next, the configuration of the image receiving unit 2 is described with reference to FIG. 2 and FIG. 3. FIG. 2 is a sectional view for illustrating the image receiving unit 2 taken along a plane orthogonal to a radiation image reception surface (described later). FIG. 3 is a sectional view of FIG. 2 as indicated by the dot-dashed line 3-3 in FIG. 2. Note that, in FIG. 2, the radiation generating unit 1 is positioned below the image receiving unit 2, and the radiation is caused to enter the image receiving unit 2 in the direction of the arrow X. For convenience of the description, in the image receiving unit 2, the side in which the radiation enters is referred to as a "front side", and a side opposite thereto is referred to as a "back side". In other words the side of the image receiving unit 2 that faces the radiation generation unit 1 is called the front side. In FIG. 2, the lower side is the front side, and the upper side is the back side. Note that, depending on the imaging situation, the vertical direction of FIG. 2 may not match with the vertical direction of the image receiving unit 2 during the actual imaging.

The image receiving unit 2 includes a radiation detecting apparatus 10a (detector unit), a supporting frame 9, and an outer case for accommodating those components therein. Further, the entire image receiving unit 2 is supported by a supporting shaft 7 provided to the one end portion of the C-shaped arm 4. Specifically, the radiation detecting apparatus 10a is supported by the supporting frame 9, and the supporting frame 9 is supported by the supporting shaft 7. Note that, the image receiving unit 2 may be configured to be supported rotatably by the supporting shaft 7. The supporting shaft 7 is a hollow shaft, and through a hollow portion thereof, a wiring/piping line 8 is passed, which is configured to connect the radiation detecting apparatus 10a of the image receiving unit 2 or the like to another apparatus or device through the C-shaped arm 4. The wiring/piping line 8 refers to at least one type of wires and pipes. Specifically, an electrical cable, which is an example of the wiring line, and a conduit line for a cooling medium, which is an example of the piping line, are applied as the wiring/piping line 8. Further, the wiring/piping line 8 is connected to the radiation detecting apparatus 10a. Note that, in the configuration in which the entire image receiving unit 2 is supported rotatably by the supporting shaft 7, the wiring/piping line 8 is made of a flexible material so that the wiring/piping line 8 can follow the rotation of the image receiving unit 2.

A casing 102 of the radiation detecting apparatus 10a accommodated in the image receiving unit 2 has a substantially cuboid external shape. Therefore, the outer case of the image receiving unit 2 also has a substantially cuboid shape conforming to the shape of the casing 102 of the radiation detecting apparatus 10a. The outer case of the image receiving unit 2 includes an image receiving unit back member 12, a contact preventing mechanism 11, and an image receiving unit front cover 13. The image receiving unit back member 12 covers the back side of the radiation detecting apparatus 10a. The contact preventing mechanism 11 is mounted to the image receiving unit back member 12, and covers the entire frame circumference of the radiation detecting apparatus 10a in plan view. With this, the contact preventing mechanism 11 can prevent the subject M from being brought into contact with the radiation detecting apparatus 10a in all surrounding directions. The image receiving unit front cover 13 is a member for covering the front side of the radiation detecting apparatus 10a, and is made of a material with a high radiation transmittance. As described above, when the entire frame circumference of the radiation detecting apparatus 10a is covered with the contact preventing mechanism 11, the entire circumference of the casing 102 of the radiation detecting apparatus 10a is opposed to an inner peripheral surface of the contact preventing mechanism 11. Further, no spatial margin is formed between a lateral peripheral surface of the radiation detecting apparatus 10a and the contact preventing mechanism 11.

Figure 4:
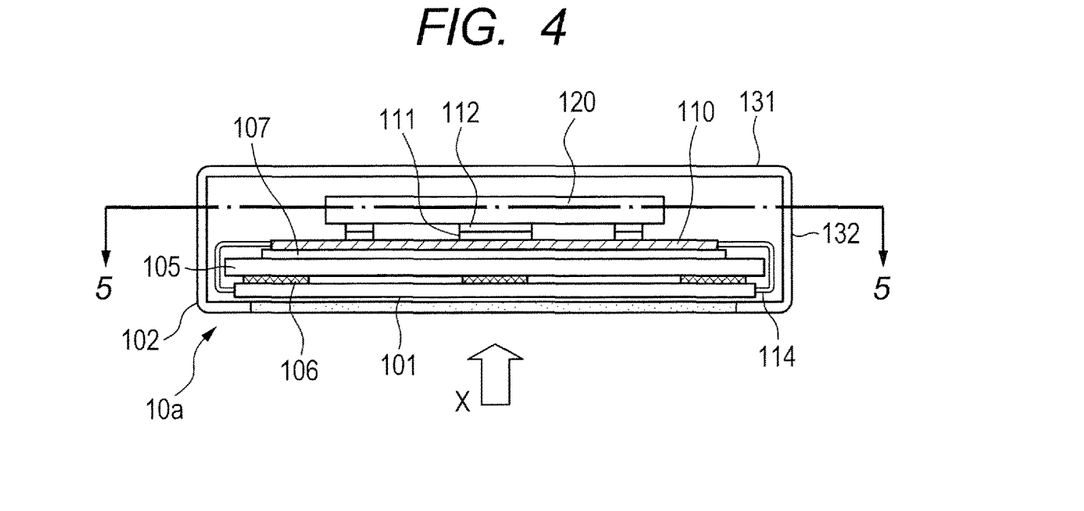
FIG. 4 is a schematic sectional view of a radiation detecting apparatus.
Figure 5:
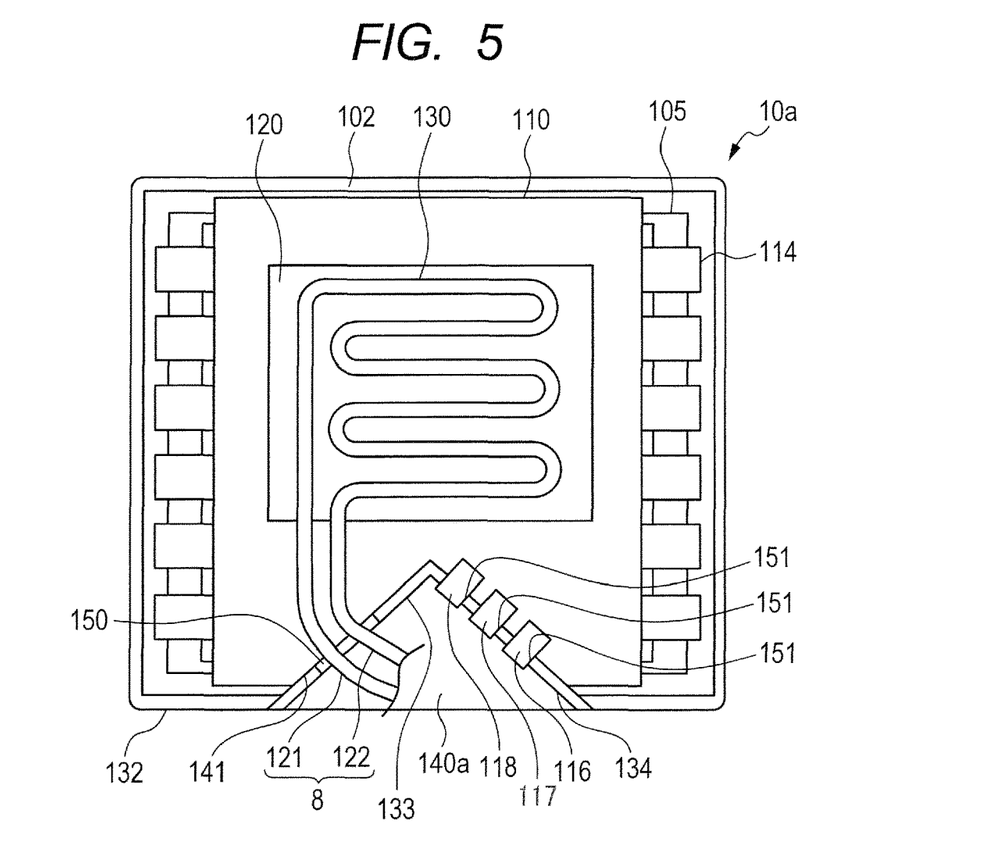
FIG. 5 is a schematic sectional view of the radiation detecting apparatus.
Figure 6A:
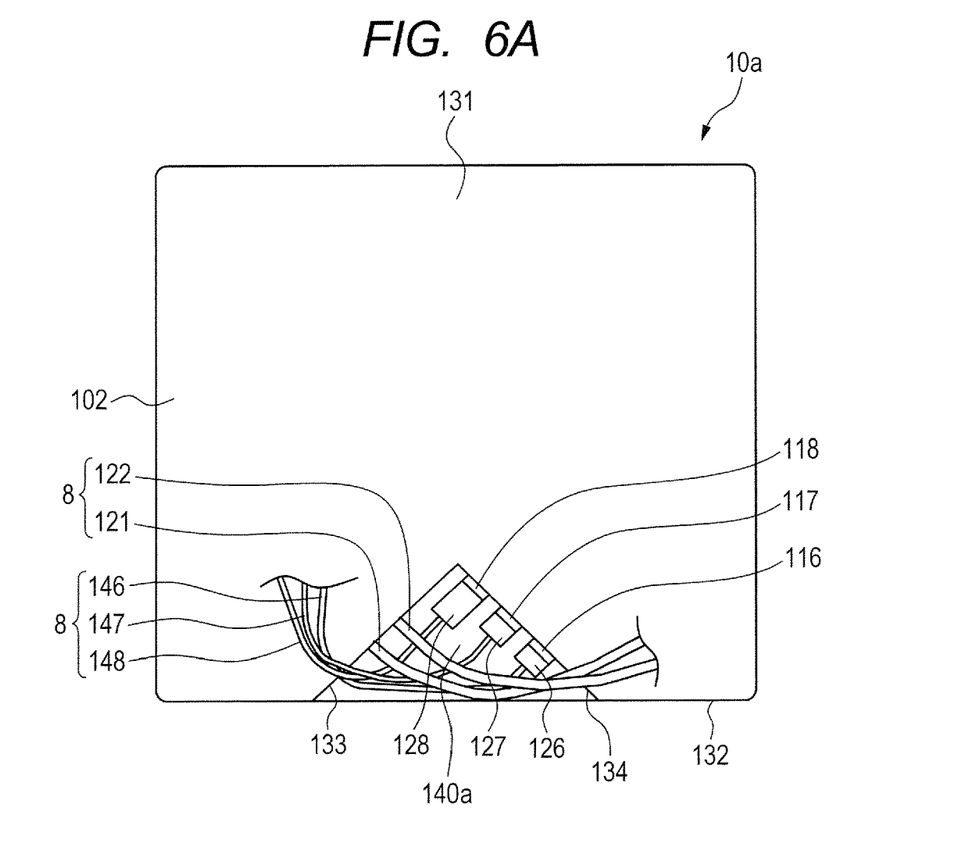
FIG. 6A is a schematic external view of the radiation detecting apparatus.
Figure 6B:
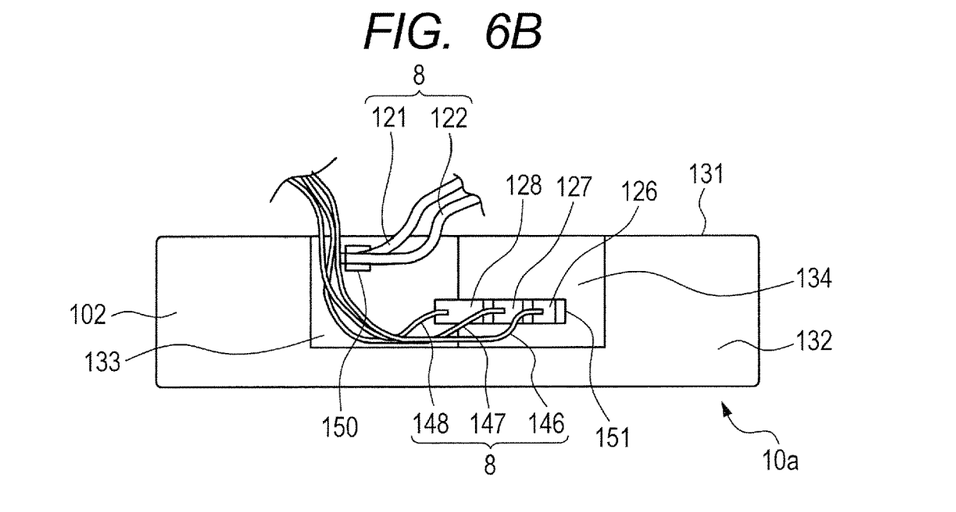
FIG. 6B is a schematic external view of the radiation detecting apparatus.

Next, the configuration of the radiation detecting apparatus 10a to be accommodated in the image receiving unit 2 of the radiation imaging apparatus 200 is described with reference to FIG. 4 to FIG. 6B. FIG. 4 is a schematic sectional view of the radiation detecting apparatus 10a taken along the plane orthogonal to the radiation image reception surface. FIG. 5 is a schematic sectional view taken along the line 5-5 of FIG. 4, and is a view of the inside of the radiation detecting apparatus 10a seen from the back side. FIG. 6A is a back view for illustrating an external appearance of the radiation detecting apparatus 10a. FIG. 6B is a lateral view for illustrating the external appearance of the radiation detecting apparatus 10a.

The casing 102 that is the outer case of the radiation detecting apparatus 10a accommodates therein a radiation detector 101, an internal support 105, an electrical circuit board 110, and a cooling unit 120. In this embodiment, the planar radiation detector 101 in a form called a both-side reading type is applied.

The planar radiation detector 101 has the radiation image reception surface that detects the entering radiation, and converts the radiation that has entered the radiation image reception surface into an electrical signal. The surface on the front side of the radiation detector 101 (surface on the lower side in FIG. 4) is the radiation image reception surface. The planar radiation detector 101 includes, for example, a plurality of CMOS imaging sensors arrayed (tiled) two dimensionally, and a scintillator (fluorescent member) configured to convert the entering radiation into visible light with a wavelength detectable by the imaging sensor. The plurality of imaging sensors each include, for example, a plurality of pixels arrayed in a matrix. Each of the pixels photoelectrically converts the visible light converted by the scintillator, to thereby generate an electrical signal corresponding to the visible light. In the planar radiation detector 101 of the both-side reading type, the pixel has two-direction paths for reading out photoelectrically converted output signals. Further, the radiation detector 101 has a quadrangular shape in plan view, and includes electrical connection portions to be connected to flexible cables 114 (described later) at two opposing sides of the four sides of the outer circumference. Therefore, the output signals of the pixel can be simultaneously read out on halves from the two opposing sides. As described above, the radiation detector 101 of the both-side reading type can shorten the time required for read-out of the pixel output signals, and hence may be applied to such a radiation imaging apparatus that high-speed processing is required.

The internal support 105 supports the radiation detector 101 through intermediation of a fixing member 106. The internal support 105 has high rigidity, and is fixed to the inner side of the casing 102 through intermediation of a stay member (not shown).

The electrical circuit board 110 is mounted on the back side of the internal support 105. In this embodiment, a configuration in which the single electrical circuit board 110 is mounted on the back side of the internal support 105 is represented. A functional member 107 is arranged between the internal support 105 and this single electrical circuit board 110. The functional member 107 has functions such as electrical insulation, X-ray shielding, electromagnetic wave shielding, and thermal insulation.

The electrical circuit board 110 transmits and receives a command to and from a system control apparatus or the like external to (or outside of) the radiation detecting apparatus 10a, and controls each portion of the radiation detecting apparatus 10a. For example, electrical elements are mounted on the electrical circuit board 110. The electrical elements mounted on the electrical circuit board 110 include a CPU, a radiation detector control circuit, an A/D converter circuit, a write access control circuit, a read access control circuit, an IC used as a frame memory, and an image output circuit. The radiation detector control circuit controls the drive of each imaging sensor of the radiation detector 101, and causes the imaging sensor to output the photoelectrically converted electrical signal as analog image data. Further, the radiation detector control circuit outputs the output electric signal (analog image data) to the A/D converter circuit. The A/D converter circuit converts the input electrical signal into digital image data. The write access control circuit inputs the digital image data output from the A/D converter circuit. Further, the write access control circuit controls the write address so as to obtain a raster image arrangement in the frame memory, and writes the digital image data to the frame memory. Further, the write access control circuit counts the number of lines in the upper-stage frame in which the write of the digital image data is ended in the frame memory, and notifies the read access control circuit of the number of lines. The read access control circuit compares an optimum read start line number set by the CPU with a written line number notified from the write access control circuit. As a result of comparison, at a time point when the written line number becomes equal to the optimum read start line number, the read access control circuit sequentially reads the image data (raster image) from the frame memory, and transfers the raster image to the image output circuit. The image output circuit outputs the raster image to the outside of the radiation detector 101 (system control apparatus or the like).

Note that, the configuration of the above-mentioned electrical circuit board 110 is merely an example, and the configuration of the electrical circuit board 110 is not limited to the above-mentioned configuration. In short, the electrical circuit board 110 is only required to have a configuration capable of controlling the radiation detector 101 based on the command from an external apparatus or device, and outputting the image data of the radiation image. Further, the electrical elements to be mounted on the electrical circuit board 110 are not limited to the above-mentioned CPU and respective control circuits. Further, separate and independent electrical elements functioning as the respective control circuits may be mounted on the electrical circuit board 110, or an electrical element encompassing functions of a plurality of control circuits may be mounted on the electrical circuit board 110.

The radiation detector 101 and the electrical circuit board 110 are connected to each other by the flexible cables 114. That is, one end of the flexible cable 114 is connected to the electrical connection portion of the radiation detector 101, and the other end thereof is connected to the electrical circuit board 110. Further, in order to realize both-side reading, as illustrated in FIG. 5, the plurality of flexible cables 114 are connected to the respective electrical connection portions on the two opposing sides of the radiation detector 101. Note that, the number of the flexible cables 114 to be connected to the radiation detector 101 is not particularly limited. The number of the flexible cables 114 may be set depending on, for example, the number of blocks divided for electrical processing (for example, in the case of the configuration with the plurality of tiled imaging sensors, the number of the tiled imaging sensors). Therefore, one flexible cable 114 may be connected or a plurality of flexible cables 114 may be connected to each of the two opposing sides of the radiation detector 101.

Through intermediation of a thermal conduction member 112, the cooling unit 120 is connected to an electrical element 111 mounted on the electrical circuit board 110, which has a large heat generation amount. Inside the cooling unit 120, an internal conduit line 130 for a cooling medium is arranged. A cooling medium supplied from an external source to the radiation detecting apparatus 10a is caused to flow through the internal conduit line 130, to thereby cool the electrical element 111 with a large heat generation amount, in the vicinity thereof, and the radiation detector 101 (that is, a heat generation source). As the electrical element 111 to be connected to the cooling unit 120 through intermediation of the thermal conduction member 112, a part or the entirety of ICs functioning as the above-mentioned CPU and respective control circuits is applied. Note that, the electrical element 111 to be connected to the cooling unit 120 through intermediation of the thermal conduction member 112 is not specifically limited, and may be determined depending on the heat generation amount or the like thereof. Further, the radiation detector 101 to which a CMOS photoelectric conversion element is applied includes an amplifier on a pixel basis. Therefore, due to the heat generated by the amplifier, the amount of dark current of a photodiode forming the pixel is changed. As a result, the characteristics of the photoelectric conversion element are changed. In this embodiment, the cooling unit 120 is used to cool the radiation detector 101 so as to suppress the change of the characteristics of the photoelectric conversion element, which is caused due to temperature rise. Thus, a high-quality radiation image can be obtained.

The internal conduit line 130 of the cooling unit 120 is connected to external conduit lines 121 and 122 for causing the cooling medium to flow. Note that, there is no limitation on which of the two external conduit lines 121 and 122 is the inlet or the outlet. Those external conduit lines 121 and 122 are caused to pass through a lead-out portion 150 formed in a wall surface of the casing 102, to thereby be led external to (or outside of) the radiation detecting apparatus 10a. As this lead-out portion 150, for example, a through hole (opening portion) that passes through the wall surface of the casing 102 is applied. As each of the external conduit lines 121 and 122, a flexible hose made of rubber or plastic can be used. With such a configuration, the external conduit lines 121 and 122 can be freely arranged, and handling of the radiation detecting apparatus 10a and determination of the external configuration are facilitated. Note that, when the priority is given to stability and reliability, each of the external conduit lines 121 and 122 may partially include a member made of a metal or a hard resin. Note that, when the image receiving unit 2 is supported rotatably by the supporting shaft 7 as described above, at least a part of each of the external conduit lines 121 and 122 is required to include a part made of a flexible material.

In this embodiment, inside the casing 102, in the order from the front side (lower side in FIG. 4), the radiation detector 101, the internal support 105, the functional member 107, the electrical circuit board 110, and the cooling unit 120 are arranged in a stacked manner. Note that, the electrical circuit board 110 and the cooling unit 120 are only required to be arranged on the back side of the radiation detector 101, and the order is not limited to that illustrated in FIG. 4. That is, a similar effect can be obtained even with a configuration in which the cooling unit 120 is arranged on the front side of the electrical circuit board 110 (and also on the back side of the radiation detector 101). Further, in this case, a member with a high thermal conductivity may be inserted between the cooling unit 120 and the radiation detector 101. With this, the thermal conduction efficiency from the radiation detector 101 to the cooling unit 120 can be increased, to thereby achieve temperature stability of the radiation detector 101. With such a configuration, even when the environmental temperature of the outside is changed or the heat generated inside is temporally or spatially varied, the temperature of the radiation detector 101 can be stabilized, and an even and high-quality radiation image can be obtained.

On the electrical circuit board 110, electrical board connectors 116, 117, and 118 capable of removably mounting electrical cables 146, 147, and 148 that are examples of the wiring line are mounted. As the electrical board connectors 116, 117, and 118, for example, various known connectors such as sockets, jacks, and receptacles, which are capable of removably mounting connectors of the electrical cables, are applied. Further, to the electrical board connectors 116, 117, and 118, cable connectors 126, 127, and 128 of the electrical cables 146, 147, and 148 included in the wiring/piping line 8 are removably connected (see FIG. 6A and FIG. 6B). As the cable connectors 126, 127, and 128 of the electrical cables 146, 147, and 148, plugs, jacks, and the like are applied. The electrical cables 146, 147, and 148 connected to the cable connectors 126, 127, and 128 are led out of the radiation detecting apparatus 10a so as to be electrically connected to the system control apparatus external to (or outside of) the radiation detecting apparatus 10a. The electrical cables 146, 147, and 148 to be connected to the radiation detecting apparatus 10a have types such as a power type, a control type, and an image data type. The power type is used for supplying power to the radiation detecting apparatus 10a. The control type is used for communicating a command, data, or the like between the radiation detecting apparatus 10a and an external apparatus or device. The image data type is used for outputting data of a fluoroscopic image (radiation image) to the external system control apparatus from the radiation detecting apparatus 10a. As the physical configuration of the electrical cables 146, 147, and 148, two or three types may be integrated with use of compound bundled wires, or all of the types may use different bundled wires. In this embodiment, the bundled wires of the three types of the electrical cables 146, 147, and 148 are independent of each other, and the three electrical board connectors 116, 117, and 118 are mounted on the electrical circuit board 110.

Further, in this embodiment, the electrical board connectors 116, 117, and 118 of a board mounting type capable of directly mounting to the electrical circuit board 110 is employed. When the electrical board connectors 116, 117, and 118 of the board mounting type are employed, the wiring for connecting the electrical board connectors 116, 117, and 118 to the electrical circuit board 110 can be omitted. Therefore, the resistance against noise from the outside can be improved. Further, the reliability can be improved, and the cost can be reduced. Further, in this embodiment, the electrical board connectors 116, 117, and 118 of a right angle type are employed. The electrical board connectors 116, 117, and 118 of the right angle type are mounted to a peripheral edge portion of a board recessed portion 141 (described later, see FIG. 5) of the electrical circuit board 110 in a direction in which the electrical cables 146, 147, and 148 are led externally (or outside) from the electrical circuit board 110 in plan view. When the electrical board connectors 116, 117, and 118 of the right angle type are employed, the electrical cables 146, 147, and 148 are connected in parallel with a mounting surface (surface on which the electrical element 111 and the like are mounted) of the electrical circuit board 110. Therefore, as compared to a configuration in which a straight type (type in which the connected electrical wiring extends orthogonally to the mounting surface of the electrical circuit board 110) is employed, the dimension in the thickness direction of the radiation detecting apparatus 10a can be reduced. Note that, when the right angle type is employed, the electrical cables 146, 147, and 148 may interfere with the mounted electrical element 111 and the like. Therefore, in this embodiment, the electrical cables 146, 147, and 148 are mounted to the peripheral edge portion of the electrical circuit board 110 so that the connected electrical cables 146, 147, and 148 extend outside from the electrical circuit board 110. With such a configuration, interference between the connected electrical cables 146, 147, and 148 and the mounted electrical element 111 and the like can be prevented.

In this embodiment, both of the radiation detector 101 and the electrical circuit board 110 have a quadrangular shape in plan view (in front view and back view). The electrical circuit board 110 is arranged on the back side of the radiation detector 101 so that the four sides of the electrical circuit board 110 are respectively arranged substantially parallel with the four sides of the radiation detector 101. The flexible cables 114 are connected to two of the four sides of the electrical circuit board 110, which correspond to the sides of the radiation detector 101 on which the electrical connection portions are arranged. The electrical board connectors 116, 117, and 118 are mounted to a peripheral edge portion of at least one side other than the two sides to which the flexible cables 114 are connected. In this case, a configuration in which the electrical board connectors 116, 117, and 118 are mounted on one of the two sides is represented, but the electrical board connectors 116, 117, and 118 may be mounted on both of the two sides. Further, the electrical circuit board 110 has the board recessed portion 141 having a triangular cut-out shape in plan view, which is formed at the side on which the electrical board connectors 116, 117, and 118 are mounted. The electrical board connectors 116, 117, and 118 are mounted side by side on a peripheral edge portion of one of the two sides of this triangular board recessed portion 141. Note that, the board recessed portion 141 of the electrical circuit board 110 is described later.

Parts of the electrical board connectors 116, 117, and 118 to be connected to the cable connectors 126, 127, and 128 are exposed externally (or to the outside) through lead-out portions 151 of the casing 102. As the lead-out portions 151 for leading out the electrical cables 146, 147, and 148, for example, through holes (opening portions) through which tip ends of the electrical board connectors 116, 117, and 118 can be inserted can be applied. With such a configuration, the electrical cables 146, 147, and 148 can be mounted to and removed from the radiation detecting apparatus 10a without removing the components constructing the casing 102. Therefore, the workability during installation or maintenance is increased.

Now, the casing 102 that is the outer case of the radiation detecting apparatus 10a is described. As illustrated in FIG. 5 to FIG. 6B, the casing 102 has a quadrangular shape in plan view and lateral view, and has a cuboid shape as a whole. The casing 102 includes a quadrangular back surface portion 131 positioned on the back side, and four lateral surface portions 132 arranged adjacent and orthogonal to the back surface portion 131. Further, the casing 102 has a cuboid space formed therein. The radiation detector 101, the internal support 105, the functional member 107, the electrical circuit board 110, and the cooling unit 120 are accommodated in the space inside the casing 102. As described above, the radiation detector 101 and the electrical circuit board 110 each have a quadrangular shape in plan view, and the radiation detector 101 and the electrical circuit board 110 are accommodated so that the four sides of each of the radiation detector 101 and the electrical circuit board 110 are arranged along inner peripheral surfaces of the four lateral surface portions of the casing 102. That is, in this embodiment, the respective four lateral surface portions 132 of the casing 102 are arranged substantially in parallel with the respective four sides of each of the radiation detector 101 and the electrical circuit board 110 in plan view.

In one of four ridge line portions formed of the back surface portion 131 and the four lateral surface portions 132 of the casing 102, a recessed portion is formed. Specifically, this recessed portion has such a form that an outer peripheral surface in a region across a part of the back surface portion 131 and a part of one lateral surface portion 132 is recessed. For convenience of the description, this recessed portion formed at least in the outer surface of the casing 102 is referred to as "casing recessed portion" 140a. In this embodiment, this casing recessed portion 140a has a triangular shape in plan view (back view). That is, among the outer peripheral surfaces of the casing recessed portion 140a, two wall surfaces orthogonal to the back surface portion 131 of the casing 102 are inclined with respect to the lateral surface portion 132 of the casing 102 in plan view. Further, those two wall surfaces are inclined with respect to the lateral surface portion 132 of the casing 102 in directions different from each other. For convenience of the description, those two (plurality of) wall surfaces are referred to as "lead-out surfaces" 133 and 134. Further, the casing 102 has a protruding portion that protrudes inwardly at a part inside the casing 102 corresponding to the casing recessed portion 140a. This protruding portion corresponding to the casing recessed portion 140a is formed not entirely in the thickness direction but in a predetermined partial range from the back surface portion 131. Specifically, in lateral view, the protruding portion is formed in a range overlapping with the electrical circuit board 110, but not overlapping with the radiation detector 101 or the internal support 105.

Further, the peripheral edge portion of one of the four sides of the electrical circuit board 110 has a recessed portion with a cut-out shape. With this recessed portion, the interference between the electrical circuit board 110 and the protruding portion corresponding to the casing recessed portion 140a is prevented. For convenience of the description, this recessed portion of the electrical circuit board 110 is referred to as "board recessed portion" 141. Note that, this board recessed portion 141 is only required to have a shape capable of preventing interference with the protruding portion corresponding to the casing recessed portion 140a. In this embodiment, a configuration in which the protruding portion corresponding to the casing recessed portion 140a has a triangular shape (that is, a substantially similar shape to the casing recessed portion 140a) in plan view is represented. In this case, the board recessed portion 141 also has a triangular shape in plan view. Therefore, the two sides of the board recessed portion 141 are inclined with respect to the lateral surface portion 132 of the casing 102. Further, the electrical board connectors 116, 117, and 118 are mounted on the peripheral edge portion of one of those two sides of the board recessed portion 141. Note that, the radiation detector 101 and the internal support 105 are positioned so as not to overlap with the protruding portion corresponding to the casing recessed portion 140a in lateral view. Therefore, the radiation detector 101 and the internal support 105 do not have a recessed portion corresponding to the board recessed portion 141.

The external conduit lines 121 and 122 for the cooling medium and the electrical cables 146, 147, and 148, which are examples of the wiring/piping line 8, are led out from the lead-out portions 150 and 151 of the lead-out surfaces 133 and 134 of the casing recessed portion 140a. Therefore, the recessed space of the casing recessed portion 140a forms a lead-out space for the wiring/piping line 8. Further, the slack of the external conduit lines 121 and 122, the cable connectors 126, 127, and 128, and the electrical cables 146, 147, and 148 are accommodated in the recessed space of the casing recessed portion 140a. Therefore, in plan view, the wiring/piping line 8 does not project from the outer profile of the radiation detecting apparatus 10a. As described above, the space to be occupied by the led-out wiring/piping line 8 is formed within the outer profile of the casing 102 in plan view. Therefore, the image receiving unit 2 having such a configuration can be applied to the radiation imaging apparatus 200 as a small-sized image receiving unit. In particular, as described above, under a state in which the radiation detecting apparatus 10a is accommodated in the image receiving unit 2, the surrounding space of the lateral peripheral surfaces of the radiation detecting apparatus 10a may be limited. In such a case, the wiring/piping line 8 is placed within the outer profile of the radiation detecting apparatus 10a in plan view. Therefore, the outer case of the image receiving unit 2 can be easily downsized.

Note that, in FIG. 5 to FIG. 6B, the configuration in which the external conduit lines 121 and 122 are led out through the lead-out portion 150 (through hole) formed in the lead-out surface 133 of the casing recessed portion 140a is represented, and the separation points of the external conduit lines 121 and 122 are omitted. Note that, a joint for separating the external conduit lines 121 and 122 from the internal conduit line 130 may be provided at a position distanced from the casing 102. Further, the joint may be fixed to the lead-out portion 150 of the lead-out surface 133 of the casing recessed portion 140a. In any of such configurations, the above-mentioned effects can be obtained. In this case, when the joint is provided at a position close to the casing 102, the radiation detecting apparatus 10a can be handled while separating the external conduit lines 121 and 122 beyond the joint. Therefore, the convenience of handling the radiation detecting apparatus 10a when being carried and installed can be enhanced.

Further, as illustrated in FIG. 5 to FIG. 6B, the external conduit lines 121 and 122 are led out from the lead-out portion 150 formed in one lead-out surface 133 of the two lead-out surfaces of the casing recessed portion 140a. In contrast, the electrical board connectors 116, 117, and 118 are provided through the lead-out portions 151 of the other lead-out surface 134. Further, the lead-out portion 150 for leading out the external conduit lines 121 and 122 from the casing 102 and the lead-out portions 151 through which the electrical board connectors 116, 117, and 118 are mounted are formed at different positions in the thickness direction (different heights). That is, the thickness-direction positions of the lead-out portions 150 and 151 differ from each other depending on the lead-out surfaces 133 and 134. With such a configuration, the external conduit lines 121 and 122 and the electrical cables 146, 147, and 148 can be easily crossed three-dimensionally, which enables less interference. Therefore, the routing of the wiring/piping line 8 is facilitated, and such a situation that the external conduit lines 121 and 122 and the electrical cables 146, 147, and 148 are entangled can be suppressed. Note that, in FIG. 6B, a configuration in which the lead-out portion 150 for the external conduit lines 121 and 122 is positioned on a side closer to the back surface portion 131 than the lead-out portions 151 for the electrical board connectors 116, 117, and 118 is represented. Note that, a similar effect can be obtained even with a configuration in which the lead-out portions 151 for the electrical board connectors 116, 117, and 118 are positioned on the side closer to the back surface portion 131 than the lead-out portion 150 for the external conduit lines 121 and 122. Further, it is only required that the lead-out portion 150 for the external conduit lines 121 and 122 be formed in one of the two lead-out surfaces 133 and 134, and the lead-out portions 151 for the electrical board connectors 116, 117, and 118 be formed in the other of the two lead-out surfaces 133 and 134. A similar effect can be obtained even when the lead-out portion 150 for the external conduit lines 121 and 122 and the lead-out portions 151 for the electrical board connectors 116, 117, and 118 are arranged so as to be laterally opposite to the arrangement illustrated in FIG. 5 to FIG. 6B.

Further, the electrical board connectors 116, 117, and 118 have different roles. Therefore, the sizes (protruding amounts) of the electrical board connectors 116, 117, and 118 and the sizes of the combined cable connectors 126, 127, and 128 may be different from each other. Further, the electrical cables 146, 147, and 148 to be led out have different levels of thickness and flexibility, such as one that has a small radius and can be bent and one that is hard and less liable to be bent. In this embodiment, as illustrated in FIG. 5 to FIG. 6B, the casing recessed portion 140a has a triangular shape in plan view, and the electrical board connectors 116, 117, and 118 are arranged in the lead-out surface 134 of the lateral surface portion 132 of the casing 102. With such a configuration, from the lateral surface portion 132 of the casing 102 toward the center, the allowable levels are increased for the sizes and the protruding amounts of the electrical board connectors 116, 117, and 118 and the cable connectors 126, 127, and 128, and the difficulty in bending of the cables. Therefore, in the order from the deep side of the casing recessed portion 140a, the electrical board connectors 116, 117, and 118 and the cable connectors 126, 127, and 128 may be arranged so that the sizes (protruding amounts) thereof are reduced. When the easiness in bending differs among the electrical cables 146, 147, and 148 to be connected, the electrical cable having more difficulty in bending may be connected to the electrical board connector on the deeper side of the casing recessed portion 140a. As described above, when the arrangement is determined depending on the characteristics (in particular, the size and easiness of bending) of the wiring/piping line 8, the space can be used more effectively.

Further, in a case of the configuration in which the lead-out surface 133 of the casing recessed portion 140a is inclined with respect to the lateral surface portion 132, the direction of the external conduit lines 121 and 122 led out from the casing recessed portion 140a only needs to be changed from a state orthogonal to the inclined lead-out surface 133. Therefore, the direction only needs to be changed by less than 90°. Therefore, a routing path with a less load on the external conduit lines 121 and 122 can be set, and the reliability of the external conduit lines 121 and 122 can be improved.

Now, an operation of mounting and removing the cable connectors 126, 127, and 128 to and from the radiation detecting apparatus 10a during installation or maintenance of the radiation imaging apparatus 200 is described. First, under a state in which the casing 102 of the radiation detecting apparatus 10a is mounted to the supporting frame 9, the contact preventing mechanism 11, the image receiving unit back member 12, and the image receiving unit front cover 13 of the image receiving unit 2 are removed. Then, in the operation of mounting and removing the cable connectors 126, 127, and 128, the operator needs to move his/her hand holding the cable connectors 126, 127, and 128 close to the vicinity of the electrical board connectors 116, 117, and 118. In this embodiment, when the cable connectors 126, 127, and 128 are connected to the electrical board connectors 116, 117, and 118, by performing the operation in the order from the electrical board connector 118 on the deepest side toward the front side, the operation is possible under a state in which the front-side space for the operation is opened. As described above, an operation access target is positioned at the inner casing recessed portion 140a of the casing 102, and hence, in order to improve the workability, a space that enables the hand to approach the vicinity of the electrical board connectors 116, 117, and 118 may be secured. According to this embodiment, the operator performs the operation under a state in which his/her hand is arranged on the right side of the cable connectors 126, 127, and 128, and thus a space for arranging the hand can be secured. In particular, the casing recessed portion 140*a* is formed across the back surface portion 131 and the lateral surface portion 132, and hence the operator can easily make an access to the lead-out portions 150 and 151 of the casing recessed portion 140*a*. Therefore, the workability during installation or maintenance is increased. Note that, when the cable connectors 126, 127, and 128 are removed from the electrical board connectors 116, 117, and 118, the operation may be performed from the front side in the order reverse to that of the mounting.

Further, according to this embodiment, without decreasing the workability, the size of the casing recessed portion 140*a* in plan view can be reduced. For example, during the operation of the cable connector 126 on the frontmost side, the hand can be arranged outside of the outer profile of the radiation detecting apparatus 10*a* in plan view. Therefore, the size of the casing recessed portion 140*a* can be reduced, and hence the size of the board recessed portion 141 of the electrical circuit board 110 can be reduced as well. Therefore, the reduction in space capable of mounting electrical components and the like in the electrical circuit board 110 can be suppressed. In particular, on the electrical circuit board 110, a large number of electrical components and an electrical circuit with a complicated pattern are mounted, and hence the space of the mounting surface tends to be insufficient. In this case, when a plurality of the electrical circuit boards 110 are provided, the cost is increased, and the reliability in connection between the electrical circuit boards 110 may be reduced. Therefore, there is a demand for use of only a single electrical circuit board 110 and increase in the space capable of mounting the electrical components and the like. According to this embodiment, the reduction in the space capable of mounting the electrical components and the like in the electrical circuit board 110 can be suppressed, and hence such a demand can be satisfied.

Further, with such a configuration, the outer size of the image receiving unit 2 having the radiation detecting apparatus 10*a* accommodated therein can be reduced. Therefore, the image receiving unit 2 can easily be brought closer to the part to be imaged of the subject M, and hence a high-quality radiation image is more easily obtained. Further, even under a state in which the radiation detecting apparatus 10*a* is accommodated in the outer case of the image receiving unit 2, the operator can make an access to the lead-out portions 150 and 151 of the casing recessed portion 140*a*.

As described above, in this embodiment, the casing 102 has the casing recessed portion 140*a*, and the electrical circuit board 110 has the board recessed portion 141. Further, the lead-out portions 151 for the electrical board connectors 116, 117, and 118 are formed in the lead-out surface 134 of the casing recessed portion 140*a*. With such a configuration, the arrangement space for the electrical circuit board 110 can be efficiently secured. Further, the lead-out surface 133 having the lead-out portion 150 for the external conduit lines 121 and 122 formed therein and the lead-out surface 134 having the lead-out portions 151 for the electrical board connectors 116, 117, and 118 formed therein are inclined with respect to the lateral surface portion 132 of the casing 102 (surface orthogonal to the front surface portion and the back surface portion 131). With this, without decreasing the workability, the efficiency of the use of the space can be more enhanced. In this manner, according to this embodiment, the space efficiency can be set properly, and the electrical circuit board 110 can be configured naturally. Therefore, a radiation imaging apparatus capable of achieving high-quality image output and multifunctional electronic control can be realized at low cost while securing high reliability.

(Second Embodiment)

Figure 7:
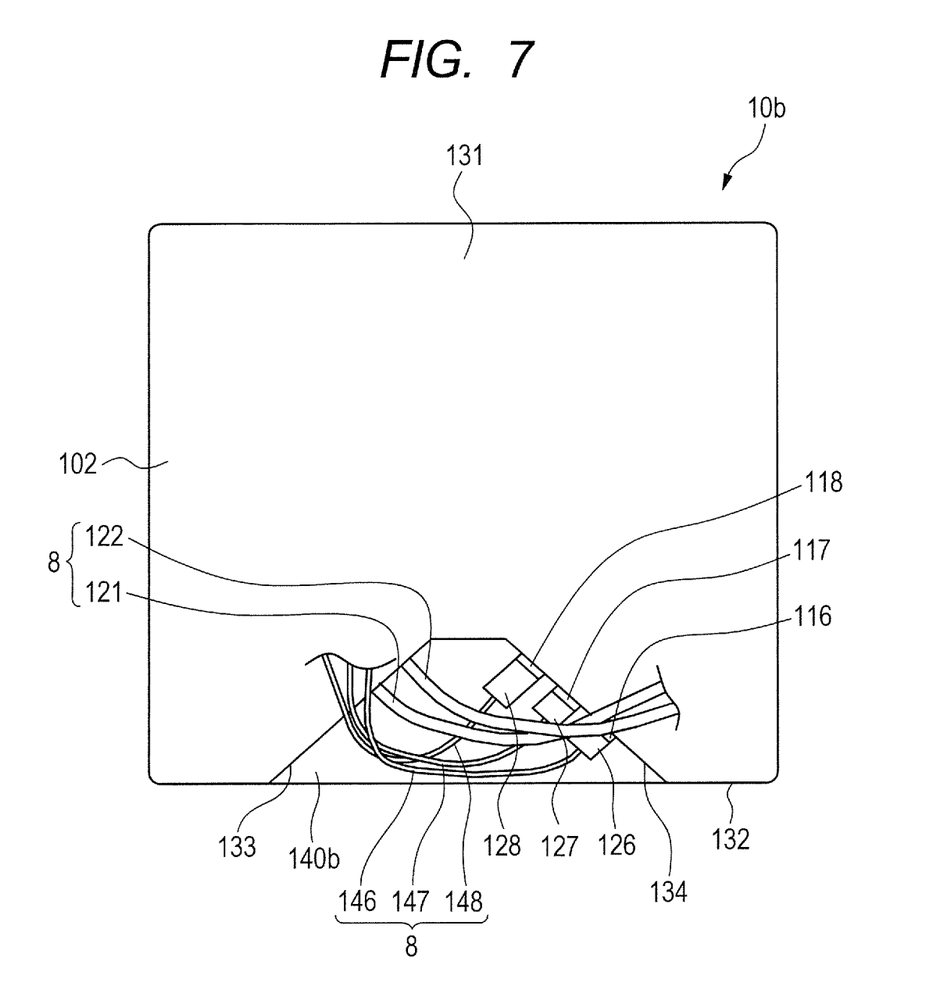
FIG. 7 is a schematic external view of a radiation detecting apparatus according to a second embodiment of the present invention.

Next, a second embodiment of the present invention is described with reference to FIG. 7. FIG. 7 is a schematic view of a configuration of a radiation detecting apparatus 10*b* according to the second embodiment, and is a view seen from the back side. Note that, configurations common to the first embodiment are denoted by like reference symbols, and description thereof is omitted herein. As illustrated in FIG. 7, in the second embodiment, a casing recessed portion 140*b* of the casing 102 has a trapezoidal shape instead of a triangular shape in plan view. Further, the external conduit lines 121 and 122 are led out from the lead-out surface 133 corresponding to one leg (oblique side) of the trapezoidal shape, and the electrical board connectors 116, 117, and 118 are mounted to the lead-out surface 134 corresponding to the other leg (oblique side) of the trapezoidal shape. Even with such a configuration, effects similar to those of the first embodiment can be obtained. As described above, also in the second embodiment, the lead-out surface 133 having the lead-out portion 150 for the external conduit lines 121 and 122 formed therein and the lead-out surface 134 having the lead-out portions 151 for the electrical board connectors 116, 117, and 118 formed therein are inclined with respect to the lateral surface portion 132.

(Third Embodiment)

Figure 8:
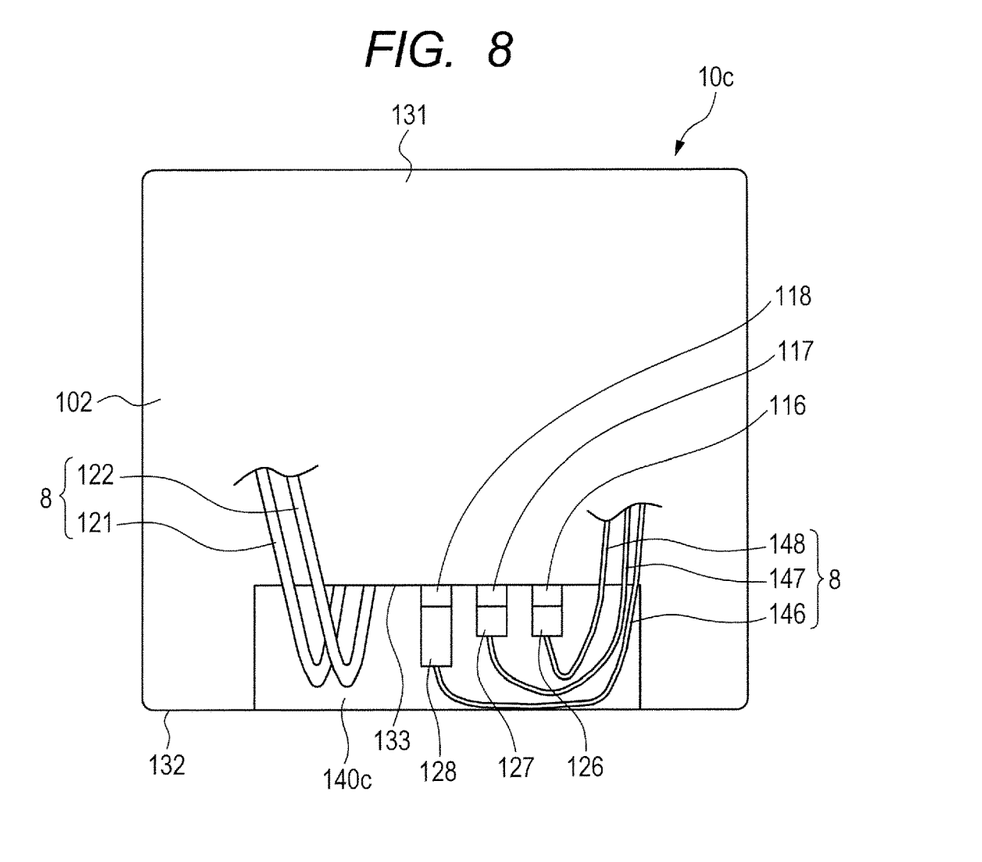
FIG. 8 is a schematic external view of a radiation detecting apparatus according to a third embodiment of the present invention.

Next, a third embodiment of the present invention is described with reference to FIG. 8. FIG. 8 is a schematic plan view of a configuration of a radiation detecting apparatus 10*c* according to the third embodiment when seen from the back side. In the third embodiment, a casing recessed portion 140*c* of the casing 102 has a quadrangular shape in plan view. Further, the lead-out portion 150 for the external conduit lines 121 and 122 and the lead-out portions 151 for the electrical board connectors 116, 117, and 118 are formed in the same lead-out surface 133. This lead-out surface 133 is formed in parallel with the lateral surface portion 132 having the casing recessed portion 140*c* formed therein. With such a configuration, there is no inclined element in the outer shape of the electrical circuit board 110 or the casing 102, and hence the component can be manufactured with a more general manufacturing method. Therefore, there is an advantage in terms of cost.

(Radiation Imaging System)

Figure 9:
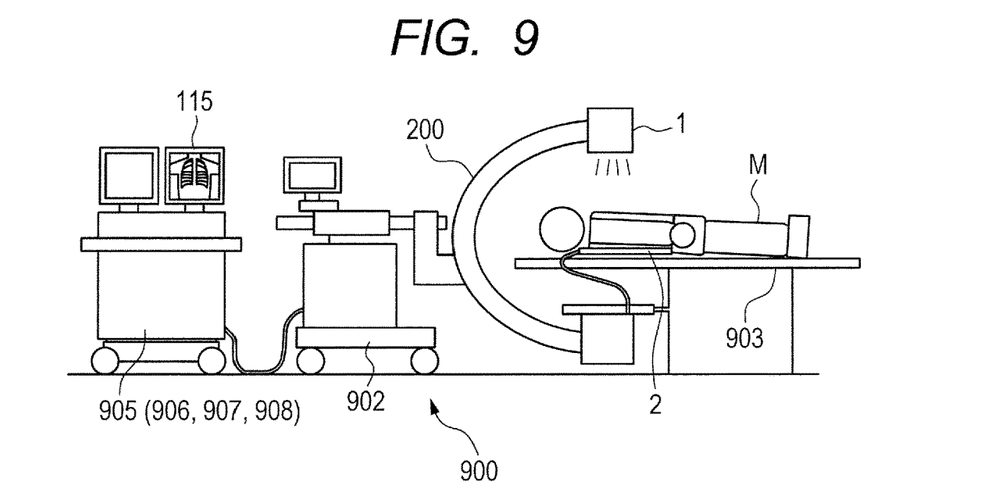
FIG. 9 is a schematic view of a configuration of a radiation imaging system.

Next, an embodiment of the radiation imaging system is described with reference to FIG. 9. FIG. 9 is a schematic view of a configuration of a radiation imaging system 900. The radiation imaging system 900 is configured to be movable. The radiation imaging system 900 includes the radiation imaging apparatus 200 to which the radiation detecting apparatus 10*a*, 10*b*, or 10*c* according to corresponding one of the embodiments of the present invention is applied, a cart 902, a system control apparatus 905, and a display unit 115. The cart 902 movably supports the radiation imaging apparatus 200 (including the C-shaped arm 4, the radiation generating unit 1, and the image receiving unit 2). Note that, in the above-mentioned embodiments, a configuration in which the C-shaped arm 4 is mounted on the ceiling C of the hospital room is represented. However, in this case, a configuration in which the C-shaped arm 4 is mounted on the movable cart 902 is represented for application to the movable radiation imaging system 900.

The display unit 115 can display a radiation image imaged by the radiation imaging apparatus 200. The system control apparatus 905 controls the radiation imaging apparatus 200 including the radiation detecting apparatus 10a, 10b, or 10c, the cart 902, and the display unit 115. The system control apparatus 905 includes a control computer 906, a console 907, and a radiation control apparatus 908, and can subject the image data of the radiation image obtained by the radiation imaging apparatus 200 to image processing to transmit the processed data to the display unit 115 or the like. Further, the image data generated through the image processing by the system control apparatus 905 can be transferred to a remote location by transmitting means such as a telephone line. With this, a doctor in a remote location can perform diagnosis using the radiation image based on the transferred image data. Further, the transmitted image data can be recorded in a film or stored in storing means such as an optical disc. Note that, the image receiving unit 2 may be configured so as to be removable from the C-shaped arm 4 so that imaging can be carried out by a radiation generating apparatus different from the radiation generating unit 1 mounted to the C-shaped arm 4. As described above, by applying the radiation imaging apparatus 200 according to each of the embodiments of the present invention to the radiation imaging system 900, imaging enabling a high-quality image to be obtained is possible.

According to the above-mentioned embodiments of the present invention, the lead-out portion for the wiring/piping line is formed in the recessed portion that is recessed across the back surface portion and the lateral surface portion of the casing. Thus, the routing of the wiring/piping line can be set within the inner side of the outer profile of the radiation detecting apparatus in plan view. Therefore, the routing space for the wiring/piping line to be connected to the radiation detecting apparatus can be saved. Further, the recessed portion is also formed in the lateral surface portion side. Therefore, an access to the lead-out portion is facilitated, and the workability during installation or maintenance can be improved. Further, the radiation detector can be downsized by saving the routing space. Therefore, the radiation detector can easily be brought closer to the subject, and thus a high-quality image can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-150201, filed Jul. 23, 2014, which is hereby incorporated by reference herein in its entirety.

What is claimed is:

1. A radiation detecting apparatus comprising:
   a radiation detector arranged to detect radiation entering the radiation detecting apparatus;
   an electrical circuit board configured to control the radiation detector;
   a cooling unit arranged to cool the radiation detector and the electrical circuit board; and
   a casing arranged to accommodate the radiation detector, the electrical circuit board, and the cooling unit therein,
   wherein an outer surface of the casing has a recessed portion that has lead-out portions formed therein, through which a wiring line removably connectable to the electrical circuit board and a piping line arranged to allow a cooling medium to flow to the cooling unit are respectively led out external to the casing, and
   wherein the recessed portion is provided in a ridge line portion formed of (1) a back surface portion, which is on an opposite side to a side in which the radiation enters the radiation detecting apparatus, and (2) a lateral surface portion adjacent to the back surface portion such that an outer surface of the casing across the back surface portion and the lateral surface portion is recessed.

2. The radiation detecting apparatus according to claim 1, wherein the recessed portion has surfaces inclined with respect to the lateral surface portion in directions different from each other in plan view, and
   wherein the lead-out portion through which the wiring line is led out and the lead-out portion through which the piping line is led out are formed in the respective surfaces inclined with respect to the lateral surface portion in the directions different from each other.

3. The radiation detecting apparatus according to claim 2, wherein the recessed portion has a triangular shape in plan view, and
   wherein the lead-out portion through which the wiring line is led out is formed in a surface corresponding to one side of the triangular shape, and the lead-out portion through which the piping line is led out is formed in a surface corresponding to another side different from the one side of the triangular shape.

4. The radiation detecting apparatus according to claim 2, wherein the recessed portion has a trapezoidal shape in plan view, and
   wherein the lead-out portion through which the wiring line is led out is formed in a surface corresponding to one oblique side of the trapezoidal shape, and the lead-out portion through which the piping line is led out is formed in a surface corresponding to another oblique side different from the one oblique side of the trapezoidal shape.

5. The radiation detecting apparatus according to claim 2, wherein the lead-out portion through which the wiring line is led out and the lead-out portion through which the piping line is led out are formed at different positions in a thickness direction of the casing.

6. The radiation detecting apparatus according to claim 1, wherein the recessed portion has a quadrangular shape having a side that is substantially parallel with the lateral surface portion in plan view, and
   wherein the lead-out portion through which the wiring line is led out and the lead-out portion through which the piping line is led out are formed in a surface corresponding to the side that is substantially parallel with the lateral surface portion.

7. The radiation detecting apparatus according to claim 1, wherein the wiring line and the piping line are led out substantially parallel with a mounting surface of the electrical circuit board.

8. The radiation detecting apparatus according to claim 1, further comprising an electrical board connector mounted on the electrical circuit board, the electrical board connector being configured to mount and remove the wiring line.

9. The radiation detecting apparatus according to claim 1, wherein the electrical circuit board has a recessed portion formed at one side of an outer circumference thereof, and
   wherein the casing has a protruding portion that inwardly projects so as to correspond to the recessed portion of the casing, the protruding portion entering the recessed portion of the electrical circuit board.

10. The radiation detecting apparatus according to claim 9, further comprising an electrical board connector mounted on a peripheral edge portion of the recessed portion of the electrical circuit board, the electrical board connector being configured to mount and remove the wiring line.

11. The radiation detecting apparatus according to claim 1, wherein the radiation detector comprises a planar radiation detector including a CMOS photoelectric conversion element.

12. The radiation detecting apparatus according to claim 1,
wherein the radiation detector comprises a radiation detector of a both-side reading type,
wherein the radiation detecting apparatus further comprises cables connected to two opposing sides of the radiation detector in plan view, the cables being electrically connected to the electrical circuit board, and
wherein the two opposing sides to which the cables are connected are positioned so as to correspond to lateral surface portions other than the lateral surface portion having the recessed portion of the casing.

13. A radiation imaging system comprising:
a radiation imaging apparatus comprising a radiation detecting apparatus, the radiation detecting apparatus comprising:
a radiation detector arranged to detect radiation entering the radiation detecting apparatus;
an electrical circuit board configured to control the radiation detector;
a cooling unit arranged to cool the radiation detector and the electrical circuit board; and
a casing arranged to accommodate the radiation detector, the electrical circuit board, and the cooling unit therein,
wherein an outer surface of the casing has a recessed portion that has lead-out portions formed therein, through which a wiring line removably connectable to the electrical circuit board and a piping line arranged to allow a cooling medium to flow to the cooling unit are respectively led out external to the casing, and
wherein the recessed portion is provided in a ridge line portion formed of (1) a back surface portion, which is on an opposite side to a side in which the radiation enters the radiation detecting apparatus, and (2) a lateral surface portion adjacent to the back surface portion such that an outer surface of the casing across the back surface portion and the lateral surface portion is recessed; and
a control apparatus configured to process image data obtained by the radiation imaging apparatus.

* * * * *